Nov. 22, 1938.   C. D. WALLACH   2,137,323
THERMAL INSULATION AND VENTILATING STRUCTURE FOR MOTOR VEHICLES
Filed May 18, 1935   2 Sheets-Sheet 1

Inventor:
Carl D. Wallach
by Davis, Macauley, May, Lindsey & Smith
Attorneys

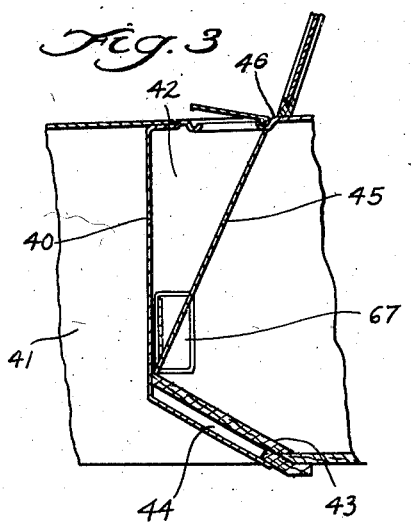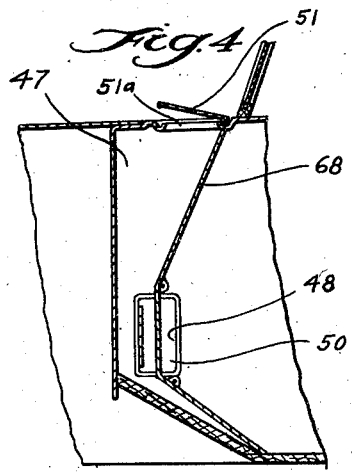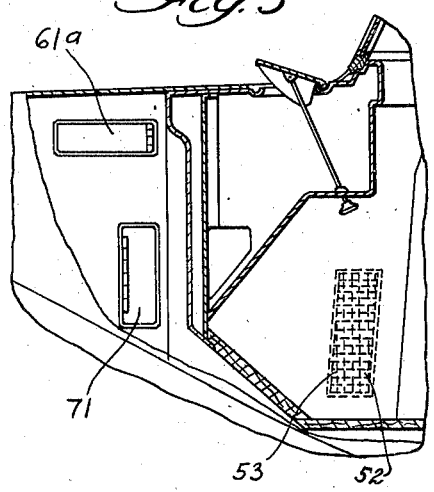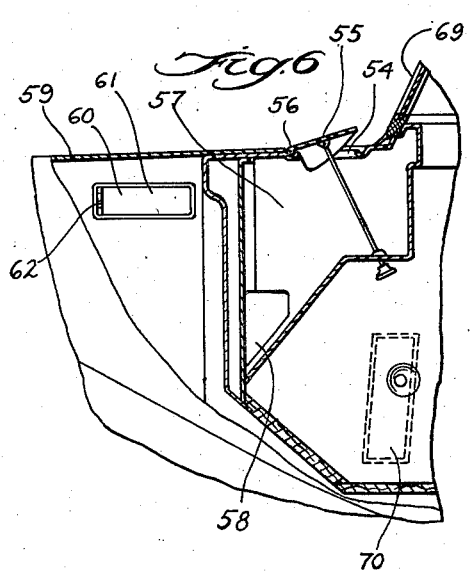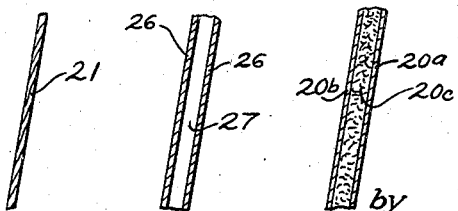

Patented Nov. 22, 1938

2,137,323

UNITED STATES PATENT OFFICE 2,137,323

THERMAL INSULATION AND VENTILATING STRUCTURE FOR MOTOR VEHICLES

Carl D. Wallach, Newburgh, N. Y., assignor to Richard Laurence Parish, New York, N. Y.

Application May 18, 1935, Serial No. 22,242

5 Claims. (Cl. 180—90)

My invention relates generally to thermal insulation and ventilation structure, and it has to do particularly with structure of the foregoing character adapted for insulating and ventilating motor vehicles.

One of the objects of my invention is to provide improved means for thermally insulating and ventilating motor vehicles.

Another object is to provide improved means for thermally insulating motor vehicle bodies of that character having a hood defining a space in which the propelling motor is located, which insulating means is adapted to minimize the transfer of heat from the hood space to the interior of the vehicle body.

A further object is to provide an air space between the hood space and the interior of the vehicle body, which space has the ability to insulate against the transfer of heat by radiation, conduction and convection and, which is closed, except for spaced-apart openings arranged for circulation of cool air through such space for ventilation and increased insulation purposes.

Another object is to provide for improved ventilation of the hood space thereby further minimizing the transfer of heat from the hood space to the interior of the vehicle body.

Still another object is to provide insulating and ventilating means of the foregoing character wherein the circulation of air through the insulating space is accomplished under forced-draft conditions by the movement of the vehicle body.

Additional objects are to provide means of the foregoing character that may be readily applied to both new vehicles and those already in use; and to provide structure for carrying out the foregoing objects which is simple and inexpensive and will serve its intended purposes in a highly efficient manner.

Other objects and advantages will become apparent as this description progresses and by the reference to the drawings, wherein Figure 1 is a fragmental side elevational view, partially in section, of a motor vehicle having one form of my invention applied thereto;

Figs. 3, 4, 5 and 6 are fragmental vertical sectional views, somewhat diagrammatic, illustrating other forms of my invention; and Figs. 7, 8 and 9 are fragmental sectional views illustrating different forms of structure that may be employed in forming one or more of the walls defining the insulation spaces shown in Figs. 1 to 6, inclusive.

It is well known that, in the operation of motor vehicles, such as passenger-type automobiles, rather high under-hood temperatures are developed, thereby making it highly desirable to insulate against the transfer of heat from the hood-space to the interior of the automobile body in providing for the comfort of the occupants thereof. My invention not only provides improved and efficient means for accomplishing this insulation, but it also contemplates improved means for reducing the under-hood temperature.

Figure 1:
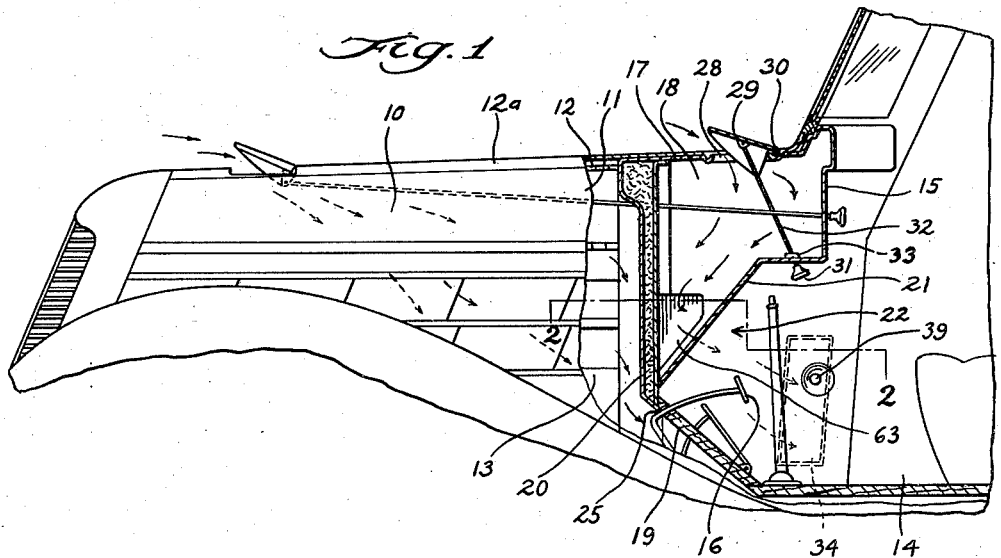
Figure 2:
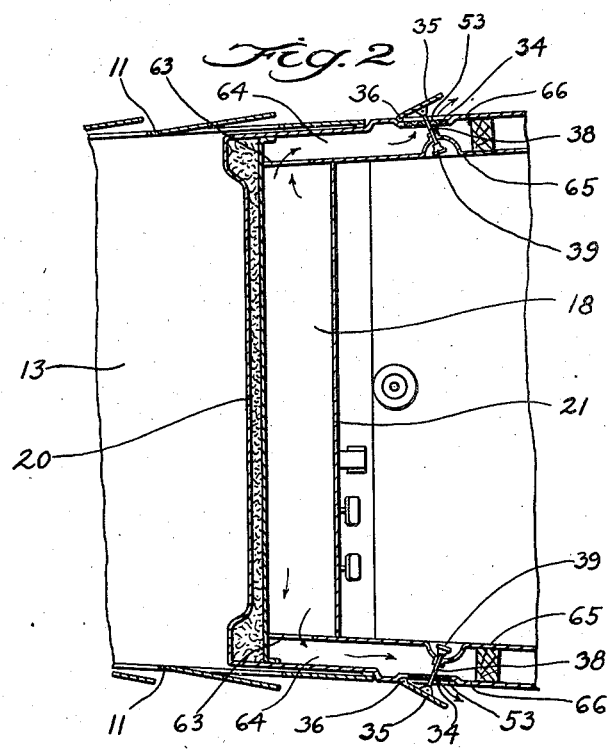
Fig. 2 is a fragmental horizontal section through the line 2—2 shown in Fig. 1.

Referring to Figs. 1 and 2, my invention is illustrated in its application to an automobile having at its front a hood 10 formed of sections 11 hingedly supported as at 12 to either side of a stationary hood portion 12a. The hood 10, together with other conventional parts defines a space 13 in which the motor (not shown) is located. This automobile structure further comprises the customary body portion 14, instrument panel 15 and operating and control devices, including foot-pedals, one of which is illustrated at 16. The hood space 13 and the interior of the car body 14 are separated by partitioning means including my invention, which will now be described.

The usual body cowl portion 17 is provided between the hood 10 and main body portion 14. At this cowl portion and between the hood space 13 and body 14, I provide an air space 18 extending throughout the height and width of the hood space 13. The space 18 is formed by the top and side walls of the cowl portion 17, the foot board 19, a vertical wall 20 located at the rear of the hood space 13 and a wall 21 located at the front of the body space 22 in spaced relation to the wall 20. These several walls are secured together in the desired spaced relationship by any suitable means, such as permanent means like spot-welding in cars being manufactured, or removable means like bolts through pierced lugs for installations on existing cars. The wall 21 and foot board 19 are provided with the desired number of openings 25 for the reception of pedal 16 and other operating and control devices (not shown). It is to be understood that the openings 25, or any other openings through which operating and control devices project, are suitably packed and sealed with respect to the device passing therethrough to maintain such openings substantially sealed.

The space-forming walls 20 and 21 are, preferably, formed in the manner illustrated in Figs. 1, 2, 7 and 9. Specifically, the wall 20 comprises a pair of sheets 20a and 20b of non-conducting material (such as wood, fibre board or the like) having any suitable insulating material 20c, such as wool, felt, cork, etc., packed therebetween.

The wall 21 is, preferably, formed of a single sheet of non-conducting material (Fig. 7), but, if desired, it may be formed in the same manner and of the same material as the other wall 20. It is to be understood, however, that I do not desire to be limited to the wall constructions just described since they may take any desired form to suit any particular condition of use. For example, these walls may take the form of a pair of sheets 26 spaced apart to form a dead air space as illustrated in Fig. 8. These sheets 26 may be formed of any material suitable to the purpose. In some instances, the sheets of all wall structures shown in Figs. 7, 8, and 9 may take the form of thin metallic sheets.

The space 18 formed by the foregoing structure is closed, except as hereinafter described, and it serves to minimize the transfer of heat from the hood space 13 to the body space 22.

To further minimize the transfer of heat through the space 18, I utilize a draft and ventilation arrangement for circulating cool air through such space. More particularly, I provide an opening 28 in the top of the cowl portion 17 leading into the space 18. This opening is, preferably, of rectangular shape and is adapted to be closed by a cover 29 similarly shaped having its rear edge hingedly mounted at 30 at the rear of the opening 28. The cover 29 may be opened and closed by a suitable handle 31 connected thereto by a rod 32 or any other suitable mechanism conveniently accessible to the driver of the car. The handle 31 may be slidably and sealably supported in any suitable manner as at 33 upon the wall 21.

I further provide openings 63 at each end of space 18 into the normal vehicle spaces 64 formed by the inner body shell 65 and the outer body shell 66. Then there are provided openings 34 in said vehicle spaces, positioned somewhat as shown in Fig. 2, said openings being adapted to be closed by covers 35 hingedly supported at 36 at their forward edges.

It will be seen from the foregoing that by opening the top cowl cover 29 and the side covers 35, air is free to circulate through the openings 28, 63, and 34 and through the space 18 and spaces 64. When the car is in motion with the top cover 29 and doors 35 (or either of them) open, cool air under pressure will be deflected by the top cover 29 and forced through the opening 28 into the space 18. Due to the fact that the side doors 35 are hinged at their front edges, the side openings 34 take the form of aspirating means by which a suction action is established as the car is moved along tending to draw air from the lower part of the space 18 through the spaces 64. In this way, the combined action of forcing air in through the top opening 28 and the withdrawing of air from the bottom side openings 34 causes, in effect, a forced-draft circulation of cool air through the space 18, thereby ventilating such space to such an extent that the tendency of heat to pass through the space 18 and into the car body space 22 from the hood space 13 is reduced to the very minimum.

The opening and closing of the side doors 35 may be controlled by the rod 38 and handle 39 (Figs. 1 and 2) or any other suitable mechanism. In the structure shown, the rod 38 supports a handle 39 accessible from the interior of the car body. By pulling the handle 39 toward the interior of the car, the doors 35 may be closed, and they may be opened by moving the handles 39 in the opposite direction.

My invention may take various forms, some of which are shown in Figs. 3 to 6, inclusive. The structure shown in Fig. 3 is quite similar to that of the previous figures, except that the wall 40 adjacent the hood space 41 and, in part, defining the insulating space 42 is extended downwardly below and along in spaced parallel relation beneath the footboard 43 to provide a dead air space 44. In this form, the wall 45 defining the other side of the space 42 extends from the rear of the upper cowl portion 46 downward with its lower edge in abutting seal relation to the footboard 43, but doors 67 are positioned directly at the ends of space 42 instead of through side passages 64 as in Fig. 2.

In Fig. 4, the insulating space 47 is formed similarly to the space 18 of Fig. 1; but, in this form, the wall 68 is V-shaped as shown, and overlies the footboard to provide a continuous insulating space with space 47. With this arrangement, when the covers 50, 51 for controlling the side openings 48 and top cowl opening 51a are open, cool air is circulated through the space 47 and air is also drawn through the openings 48 from the interior of the car body.

If desired, the side openings may not be provided with an adjustable cover, as shown in Fig. 5. This form of my invention is similar to that of Fig 1, except that the side openings 52 are covered only by a suitable screen 53, which screen is also shown in Fig. 2 in combination with door 35. In this way, the desired aspirating effect is provided by the screen side openings and the desired insulating and ventilating effects above described are accomplished.

In certain cases, it may be desirable to reverse the opening of the upper cowl ventilator door as shown in Fig. 6. In that case, the upper cowl ventilating opening 54 is closed by a door 55 hinged, as at 56, along its front edge so that it opens rearwardly toward a windshield structure 69 (Fig. 6). Otherwise, this particular form of ventilating means is the same as that of Fig. 1. In this instance, cool air striking the upright windshield structure 69 is deflected downwardly, and through the cowl ventilator opening 54, and it is then circulated through the ventilating space 57 and the side ventilating openings 58 and 70 in a manner already described.

As a further aid in carrying forward my invention, I provide a novel ventilating arrangement for the hood space as shown, more particularly, in Fig. 6. I have found that, in the use of prior hood ventilating devices, pockets exist in which the high temperature hood air is trapped thereby greatly lowering the efficiency of known hood ventilating devices. This is particularly true with respect to the upper rear portion of the hood space. As shown in Fig. 6, I eliminate this efficiency-lowering trap condition by providing in the upper rear side portions of the hood 59 elongated ventilating openings 60 extending lengthwise of the hood and each adapted to be closed by a door 61 hingedly connected at its front end, at 62, to the hood 59. The doors 61 (only one is shown) may be opened and closed in any suitable manner, and it will be seen that when they are open the adjacent hood space is vented and, when the car is in motion, an aspirating effect is set up at the opening 60 tending to rapidly draw the heated air from the hood space. This feature of my invention is not limited to the form shown in Fig. 6, but may be used with all forms of my invention, as for instance, the door 61a, Fig. 5, may be hinged at the rear end to receive cool air and exhaust with a lower door 71 hinged in front, or through slats in the hood (not shown).

It is believed that the operation of my invention as well as the advantages above first stated, will be clearly understood from the foregoing description. It is to be understood that, while I have shown various forms of my invention, other changes in details and arrangements of parts may be made without departing from the spirit and scope of my invention as defined by the claims that follow.

I claim:

1. Thermal insulation structure for a motor vehicle having a hood portion defining a space adapted to receive a heat-generating motor and a body portion defining a space adapted to receive the vehicle occupants, comprising means forming a closed space between said hood and body spaces, means including an opening connecting the top of said closed space to the outside of the vehicle, means including a common opening connecting both said closed and said body space to the outside of the vehicle, and covers operable to open and close said openings.

2. A motor vehicle construction comprising the combination with a hood portion defining a space adapted to receive a heat-generating motor and a body portion defining a passenger-carrying space having spaced inner and outer walls at the forward sides thereof, of a cowl portion comprising an air space defined by the top and side walls of the cowl portion, a foot board, a heat insulating wall at the rear of the hood to separate the hood space from the cowl space, and a second heat insulating wall at the front of the body space in spaced relation to the former wall, means for maintaining a forced circulation of fresh air from outside of the vehicle through the cowl space, openings connecting the space between the inner and outer body walls with the cowl space for passing the said fresh air between the body walls, and eduction openings for the said air.

3. A motor vehicle construction comprising the combination with a hood portion defining a space adapted to receive a heat-generating motor and a body portion defining a passenger-carrying space, of a cowl portion comprising an air space defined by the top and side walls of the cowl portion, a foot board, a heat insulating wall at the rear of the hood to separate the hood space from the cowl space, and a second heat insulating wall at the front of the body space in spaced relation to the former wall, means for sweeping the cowl space with air from outside of the vehicle responsively to the speed of travel of the vehicle, the said means comprising top and side ventilating openings adapted to produce a forced circulation of air through the said space, and air ducts around the forward portion of the said body portion but externally thereof for maintaining a circulation of fresh air around the said forward portion of the body, and devices for controlling admission of air to the cowl space.

4. A motor vehicle construction comprising the combination with a hood portion defining a space adapted to receive a heat-generating motor and a body portion defining a passenger-carrying space, the body portion having spaced inner and outer walls at the forward sides thereof, of a cowl portion comprising an air space defined by the top and side walls of the cowl portion, a foot board, a heat insulating wall at the rear of the hood to separate the hood space from the cowl space, and a second heat insulating wall at the front of the body space in spaced relation to the former wall, and means for maintaining a forced circulation of fresh air from outside of the vehicle through the cowl space and between the inner and outer walls of the body portion, the said means comprising air-induction openings for the cowl space, deflecting means for deflecting air into the said openings, and air eduction openings at the sides of the vehicle for exhausting the air from the cowl space and from between the body walls responsively to suction created by movement of the vehicle.

5. Thermal insulation structure for a motor vehicle having a hood portion defining a space adapted to receive a heat generating motor and a body portion defining a space adapted to receive the vehicle occupants, comprising means forming a closed space between the said hood and body spaces, means including an opening connecting the closed space to the outside of the vehicle, means including a common opening connecting both the closed space and the body space to the outside of the vehicle, and devices enabling a production of forced air circulation through the said closed space and the body space.

CARL D. WALLACH.